April 5, 1966 J. R. COLSTON 3,244,370

FLUID PULSE CONVERTER

Filed Jan. 18, 1963 4 Sheets-Sheet 1

INVENTOR

JOHN R. COLSTON

BY Hurvitz & Rose

ATTORNEYS

INVENTOR
JOHN R. COLSTON
BY Hurvitz & Rose
ATTORNEYS

INVENTOR
JOHN R. COLSTON
BY Hurvitz & Rose
ATTORNEYS

April 5, 1966 | J. R. COLSTON | 3,244,370

FLUID PULSE CONVERTER

Filed Jan. 18, 1963 | 4 Sheets-Sheet 4

INVENTOR

JOHN R. COLSTON

BY Hurvitz + Rose

ATTORNEYS

United States Patent Office 3,244,370 Patented Apr. 5, 1966

3,244,370
FLUID PULSE CONVERTER

John R. Colston, Silver Spring, Md., assignor to Bowles Engineering Corporation, Silver Spring, Md., a corporation of Maryland Filed Jan. 18, 1963, Ser. No. 252,432
23 Claims. (Cl. 235—201)

The present invention relates to fluid pulse converters and more particularly to a fluid pulse converter employing pure fluid amplifiers utilizing boundary layer effects.

There have become avaliable recently a number of different types of pure fluid amplifier elements, one of which is a bistable device having many of the same basic characteristics of the electronic flip-flop. A pure fluid flip-flop device is an element having a fluid stream issuing into an interaction region and having control nozzles positioned on opposite sides of the stream such that when fluid is emitted from a control nozzle the main fluid stream is deflected away from the incoming control stream. The interaction region is provided with sidewalls positioned such relative to the main stream that when the stream is deflected to one side or the other of the device, the stream interacts with the sidewalls to produce a boundary layer effect. The boundary layer effect reduces the pressure in the interaction region between the stream and the nearer sidewall relative to the pressure between the stream and the further sidewall. The stream is deflected by this differential in pressure. By appropriate positioning of the sidewalls, the differential in pressure may be such that the stream intersects with the sidewall and remains locked thereto. When it is wished to deflect the stream a fluid signal is applied between the stream and the sidewall to which it is locked in order to raise the pressure between the stream and the sidewall to a value greater than that existing on the other side of the stream. The stream thereby is deflected to the other sidewall of the system where it remains locked until a further fluid signal is applied to detach the stream.

In order to convert a flip-flop of the type described above, to a pulse counter or converter it is necessary to cause the flip-flop to switch between the two sidewalls in response to successive input pulses to the system. Thus, the converter requires that each fluid pulse be diverted to the fluid control nozzle adjacent which the stream is at that moment positioned. This fluid pulse causes the stream to switch to the other sidewall of the interaction region and the next fluid pulse must then be applied to the fluid control nozzle adjacent which the fluid stream now subsists. In accordance with U.S. Patent No. 3,001,698 issued on Sept. 26, 1961 to Raymond W. Warren and entitled Fluid Pulse Converter a flip-flop is made into a pulse counter or converter by an ingenious system in which the two control nozzles are connected together upstream of the main power nozzle which supplies fluid to the interaction region of the flip-flop. Specifically, the nozzles are connected to two distinct flow paths which extend about a common island divider having a relatively sharp apex termination directed away from the basic flip-flop element. The channels then join below the apex of the divider and are supplied with fluid from a further fluid input which fluid is directed at the divider of the aforesaid island divider. When the fluid in the main power stream in the flip-flop flows into the associated interaction region and attaches to one sidewall, for instance, the right sidewall, it tends to draw fluid through the right control nozzle and evacuate the passage associated with this nozzle. This effect sets up a circulating fliud current which flows into the left nozzle around the island divider and back to the right nozzle where it is being evacuated by means of the high speed power stream. When fluid is admitted to the fluid supply nozzle to the common channel connecting the control nozzles, the fluid flow around the end of the island divider deflects the incoming stream in this particular instance into the channel associated with the righthand control nozzle. This flow then is directed through the passage and through the righthand control nozzle to contact with the main power stream in the interaction region. The main power stream is deflected to the left sidewall where it remains positioned for the time being. The flow of the main power stream against the left sidewall evacuates fluid through the left control nozzle from its associated passage and establishes a flow from the interaction region through the right control nozzle through its associated passage around the apex of the island divider and through the left control nozzle into the power stream. When a fluid pulse is again applied to the region of juncture of the channels joining the two control nozzles, the fluid flow established therein deflects the stream to the left and the stream issues from the left control nozzle diverting the main power stream to the right sidewall. Thus, successive input pulses are diverted alternately to the left and right control nozzles so as to cause switching of the main power stream of the flip-flop in response to successive input signals. The apparatus forms a basic counter element or pulse converter as referred to the aforesaid U.S. patent.

It is an object of the present invention to provide a fluid pulse converter or counter of the type described above in which the input impedance thereto is relatively insensitive to variations in load at the output from the flip-flop element.

It is another object of the present invention to provide for pressure regulation in various regions of the flip-flop element from which the fluid flow is diverted.

It is another object of the present invention to provide a fluid pulse converter constructed so as to permit in-line cascading or sandwich-type cascading of the elements.

It is another object of the present invention to provide a pure fluid pulse converter having set and reset features at all or at particular counter locations.

It is still another object of the present invention to provide a pure fluid pulse converter in which the operation of the entire system is highly insensitive to severe variations in load impedance.

Another object of the present invention is to provide a fluid pulse converter having a region highly sensitive to the present state of the device for diverting an input fliud pulse to the proper control region for effecting switching of the device to another state.

The above and still further objects, features and advantages of the present invention will become apparent upon consideration of the following detailed description of several specific embodiments thereof, especially when taken in conjunction with the accompanying drawings, wherein.

Figure 1:
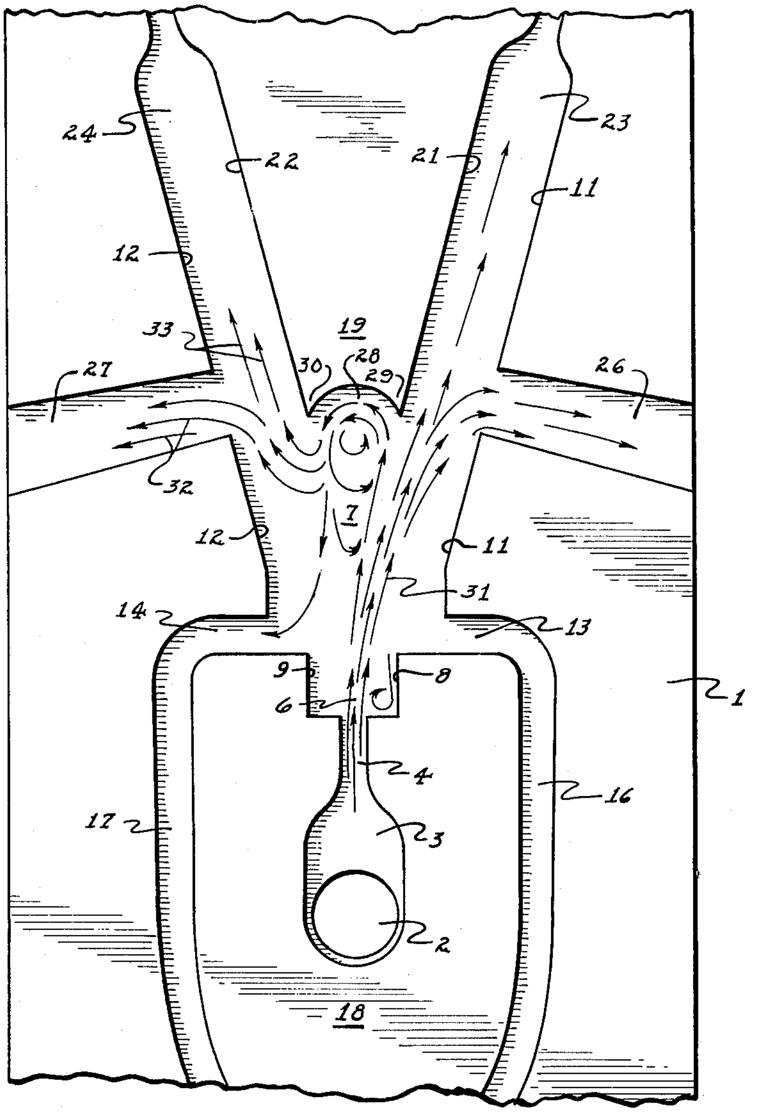
FIGURE 1 is an illustration of a flip-flop stage employed in the converter of the present invention.

Referring now specifically to FIGURE 1, there is illustrated the flip-flop element employed in the apparatus of the present invention. The element has channels formed in a plate 1 of a suitable material which may be a plastic, ceramic, glass, metal, etc. The channels are formed in one surface of the plate 1, the top surface as illustrated in FIGURE 1, and the various channels are sealed relative to one another and relative to the ambient atmosphere by means of a cover plate which is not illustrated in FIGURE 1 (or any of the other figures) for purposes of clarity.

Fluid under pressure is applied to the flip-flop via a port 2 through the plate 1. The port 2 is connected to a power nozzle 3 which issues fluid through an orifice 4 into a booster region 6 and thence into an interaction region 7. The booster region 6 is formed by a generally square-shaped channel having sidewalls 8 and 9 generally (through not necessarily) parallel to the walls forming the orifice 4. The interaction region 7 is defined on its right side by a right sidewall 11 and on its left side by a left sidewall 12. A right control nozzle 13 extends through the right sidewall 11 and a left control nozzle 14 extends through the left sidewall 12. The nozzle 13 is connected to a downwardly extending flow channel 16 to which fluid control signals may be suitably applied as will be described in more detail subsequently. A nozzle 14 is also connected to a downwardly extending flow channel 17, the two channels 16 and 17, the two nozzles 13 and 14 and the interaction region 7 defining an island divider 18.

Located approximately 7 to 8 nozzle widths downstream from the end of the orifice 4 is a flow divider 19 having outwardly and upwardly diverging right and left sidewalls 21 and 22, respectively. The right sidewall 21 of the divider 19 cooperates with the sidewall 11 to form therebetween a first outlet channel 23. The left sidewall 22 of the divider 19 defines, in conjunction with the left sidewall 12, a left output channel 24.

A first vent channel 26 extends through the sidewall 11 in the general region of the bottom of the flow divider 19 while a corresponding vent 27 extends through the left sidewall 12. The bottom of the flow divider 19, facing the control nozzle 3, has a generally semi-circular recess 28 formed therein to define with the sidewall 21 and 22 thereof, right and left cusps 29 and 30. A straight line drawn between the apices of the cusps passes into the vent channels 26 and 27 at predetermined locations relative to the upper and lower walls of the vent channels for purposes to be described subsequently.

In operation, assume that fluid under pressure is initially supplied through the port 2 to the nozzle 3 and establishes a main power stream issuing from the orifice 4. Due to some slight initial perturbation in the stream, the stream deflects toward one of the sidewalls 8 or 9 of the chamber 6 and due to boundary layer effects the entire stream is switched to one of the sidewalls, for instance the sidewall 8. The generally triangular region between the power stream of the sidewall 8 and the end wall of the recessed portion 6 adjacent the orifice 4 has the fluid therein, evacuated at a more rapid rate, due to proximity of the stream to the wall 8, than the region to the left of the power stream and adjacent the sidewall 9. Due to the rapid withdrawal of fluid from the region adjacent the wall 8, the pressure therein is reduced relative to that on the other side of the stream and the stream is deflected into the position illustrated in FIGURE 1. It is wished to emphasize that the initial deflection might just as well have been toward the opposite sidewall 9 depending upon the instantaneous initial circumstances which vary from one starting time to another starting time.

Bending of the main power stream due to the differential in pressure established thereacross in the region 6, causes the stream to contact the portion of the sidewall 11 between the control nozzle 13 and the vent channel 26 to form another boundary layer region which further tends to lock the main power stream to the right side of the device.

The region 6 is operative as a booster section to enhance the boundary layer effects or lock-on properties of the stream so as to render the lock-on properties less susceptible to back loading of the device due to blockage of the one or the other of the outlet channels 23 and 24. It will be noted that the booster section is located such as to be almost completely decoupled from the outlet channel as a result of its proximity to the nozzle 4, its remoteness from the channels 23 and 24 and the operation and location of the vent channels 26 and 27. In consequence, the booster section 6 tends to maintain a desired boundary layer condition in spite of severe back loading. The ability of the stream to remain locked in a given position in spite of complete blockage of an outlet channel is, however, a result of many factors and not only the use of the booster section although the latter is an important contributor to this effect. The ability to remain locked in a given position is also a function of the vent channels 26 and 27 and of the cusp arrangement of the divider 19 provided by the semi-circular recess 28 in its lower end as viewed in FIGURE 1. Specifically, although the main energy and pressure portion of the stream is directed along a path as indicated by an arrow 31, spreading of the stream permits a portion thereof to be scooped or peeled off by the cusp 29. This portion of the stream is diverted by the semi-circular region 28 into paths indicated by the various arrows emanating from this region. Some of the fluid is directed back against the left side of the main power stream, thereby further enhancing the differential in pressure which tends to cause the stream to remain locked to the right sidewall of the interaction region 7. Other portions of the fluid move downwardly and through the control nozzle 14 into the passage 17. The utility of this flow will become apparent upon complete description of the pulse converter. Other portions of the fluid as indicted for instance by arrows 32 are directed through the bottom region of the outlet passage 24 and into the vent 27. Still other portions of the fluid are directed against the sidewall 12 and may move upwardly or downwardly depending upon their initial position relative to other flow lines in the channel. Still other portions of the fluid as indicated by arrows 33 pass into the region of the chaanel 24 above the vent 27.

The pressure maintained in the outlet passage 24 from which flow has been diverted at this time is determined by the position of the vent 27 relative to the apices of the cusps 29 and 30. With the vent 27 in the position illustrated, the pressure in the channel 24 is approximately ambient pressure assuming that the vent channels 26 and 27 open to ambient pressure. It must be realized that the flow along the lines indicated by arrows 32 through the vent 37 tends to entrain air in the channel 24 and reduce the pressure therein. However, the positioning of the vent 27 is such that the amount of air flowing along the paths indicated by the arrows 33 is just sufficient to balance the entrainment due to flow through the channel 27. If the vent 27 were to be moved upstream; that is, toward the nozzle 3, a larger proportion of the fluid would flow directly through the channel 27 and the pressure in the output channel 24 would be lower than ambient pressure. If the vent channel 27 were moved further downstream from the nozzle 3 than illustrated, a larger proportion of the fluid would flow into the channel 24 in preference to the vent 27 and the static pressure in the channel 24 would be above ambient pressure. Thus, the location of the vent 27 relative to the upstream end of the divider 19 is important in determining the pressure in the unselected output channel and permits, by simple changes in placement of the vent, design of systems working at specific quiescent pressures. It will be noted that in the specific example illustrated, the upstream end of the divider 19 as defined by the apices of cusps 29 and 30 lies at about one-third of the distance between the walls of the vents, downstream from the upstream walls thereof. This location is actually not very critical and variations of from about 25 to 37% of this distance would not appreciably affect the pressure in the outlet channels.

The location of the vents 26 and 27 relative to the cusps also determines the static pressure in the interaction region thereby at least partially determining the input impedance of the system. The fluid scooped off by the cusp 29 or 30, supplies the fluid entrained by the power stream, supplies the circulating fluid to the channels 16 and 17 and fluid to the vent and output channel on the unselected side of the device. Thus, a predetermined static pressure may be maintained in the region 7 adjacent the stream. Further, the vent 26 permits the overflow of fluid from the power stream which results from partial or complete blockage of the outlet channel 23, to be exhausted from the stream without returning to the interaction region 7 and without appreciably affecting the pressure therein. In consequence of the action of the cusp 29 and vent 26, the static pressure in the region 7 remains a relatively constant value regardless of loading of the apparatus and the device presents a constant input impedance to the system.

The vent passage 26 serves a further function in that in preventing undue build up of static pressure in the region 7 fluid does not tend to flow into the booster region 6 or along the wall 11 as it would if a large back pressure is built up in the system. Therefore even complete blockage of the output channel is insufficient to divert the stream from the position illustrated. In the particular device illustrated a complete blockage of the outlet passages is not provided but the passages do terminate in a nozzle; that is, a resistor or a constriction which does cause a substantial rise in pressure in the outlet channels.

Everything that has been said about the functioning of the system with the power stream directed to the outlet channel 23 is true with the stream directed to the outlet channel 24.

Figure 2:
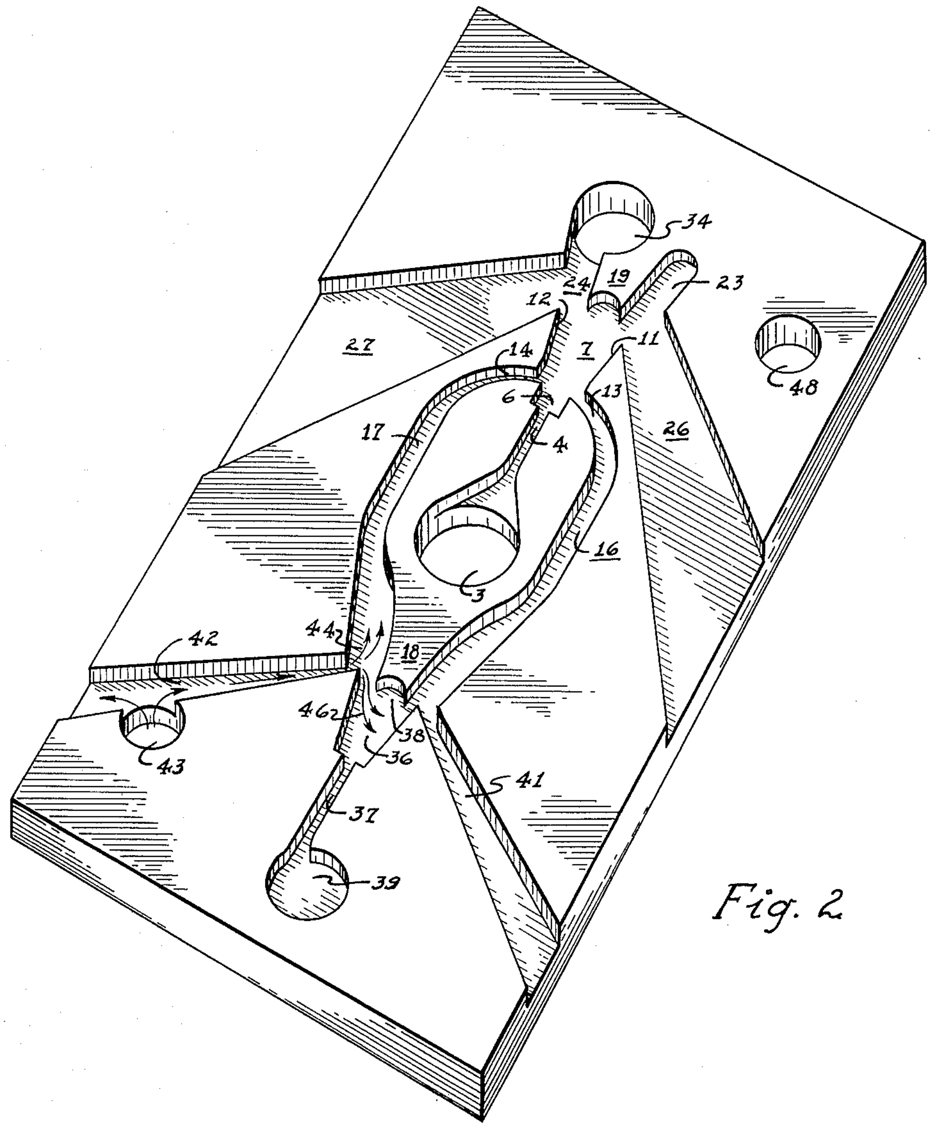
FIGURE 2 illustrates a converter stage employing the flip-flop element of FIGURE 1.

Referring now specifically to FIGURE 2 of the accompanying drawing, there is illustrated a complete counter stage utilizing the flip-flop design illustrated in FIGURE 1 of the accompanying drawings. The reference numerals employed in the flip-flop description of FIGURE 1 are employed in FIGURE 2 where appropriate. The flip-flop of FIGURE 1 has been altered in two respects only. The outlet channel 23 is dead-ended in FIGURE 2 and the outlet channel 24 flows into a circular chamber 34 which is employed as a vortex transfer unit to another pulse converter stage formed in another plate position either above or below the plate 2 as will be described subsequently.

The passages 16 and 17 are joined in a region 36 positioned below, in the drawing of FIGURE 2, the island divider 18. A nozzle 37 directs the fluid into the region 36 and along the centerline of the island divider 18. The divider 18 is formed with a semi-circular recess 38 at its lowermost end. The nozzle 37 may be fed from a fluid vortex transfer chamber 39.

In operation it is assumed that the power stream from the nozzle 4 is initially diverted to the outlet channel 23, the power stream retaining its position even though the output channel is blocked. As described above, this results from the fact that the overflow is exhausted to ambient surroundings via the vent channel 26. Flow of the main fluid stream across the control nozzle 13 causes fluid in the channel 16 to be drawn into the power stream thereby reducing the pressure therein. The withdrawal of air from the channel 16 causes a flow of fluid upwardly as illustrated in FIGURE 2 in this channel and in effect establishes a circulating current from the left side of the region 7 through the control nozzle 14, passage 17, the region 36, around the bottom of the island divider 18, up the passage 16, through the nozzle 13 and into the power stream.

If an input fluid pulse is now applied through the chamber 39 to the nozzle 37, fluid flow is established into the region 36. The counterclockwise circulating current passing through the region 36 causes the fluid issued by the nozzle 37 to be deflected to the right. The stream flows up channel 16 and issues through the nozzle 13 to deflect the power stream to the left side wall 12 of the flip-flop device.

As previously indicated, and reference is again made to FIGURE 1, the cusp 29 peels off a portion of the main stream and causes it to be diverted not only against the power stream but back into the interaction region 7 thereby maintaining the pressure in this region against withdrawal of fluid through the nozzle 14 and passage 17 due to the counter rotating flow established around the island divider 18. Thus, the fluid which is supplied as a result of the use of the cusp 29 in region 28 also supplies fluid for the circulating flow around the island divider permitting the pressure in the interaction region to the left of the main stream to be maintained. This permits a larger pressure differential to be maintained at the ends of the flow path around the island divider 18 than would be possible otherwise and consequently enhance the counterclockwise flow so as to render the input fluid pulse more sensitive to the existing state of the device. The lower flip-flop comprising the nozzle 37, region 36, channels 16 and 17, etc. is provided with a reset vent 42 and a preset vent 41. The reset vent 42 is employed for two distinct purposes. It is utilized in conjunction with a reset port 43 to set the counter stage, illustrated in FIGURE 2, to a zero condition. The zero condition is established when the stream of the upper flip-flop is deflected to the output channel 24. More particularly, fluid flow provided to the port 43 passes through the vent 42 and enters the channel 17. The vent is positioned above the bottom of the island divider 18 so that the flow therefrom issues as indicated by the arrows 44 and 46. The arrow 46 indicates that the flow is such as to intercept the fluid issuing from the nozzle 37 to direct it to the passage 16. If the vent 42 were moved downwardly relative to the island divider 18 so that the vent caused fluid to flow directly across the bottom of the island divider, a clockwise vortex would be created in the region above the nozzle 37. The vortex might cause the fluid stream to be diverted to the channel 17 instead of to the channel 16. By placing the vent as illustrated in FIGURE 2 above the bottom of the island divider 18, the flow into the region of the nozzle 37 is restricted to patterns as illustrated by the arrows 46, thus insuring that the flow from the nozzle 37 is directed to the passage 16.

The vent 42 is also employed to accept overflow of fluid due to constriction of the upper regions of the passage 17 to form the orifice 14. More particularly, the fluid supplied to the nozzle 37 is received from a unit corresponding to that illustrated in FIGURE 2. The fluid is applied through the outlet port 34 of one stage to the inlet port 39 of the next succeeding stage. Therefore, the quantity of flow supplied to the nozzle 37 is the output quantity from the device. This may be a considerable quantity of fluid and may be greater than can be passed by the orifice 14. Thus, there is a build up of fluid in the passage 17 which must be vented in order to sustain proper operation. This excess fluid is vented through the vent 42. The vent 41 serves the same purpose relative to this latter function as the vent 42 in accepting overflow fluid from the passage 16. However, the passage 41 also provides the device with a preset capacity. By directing fluid into the vent 41 of selected stages of the apparatus, while directing fluid to other stages of the counter through vents 42, a preset count may be applied to the counter. In such a case, inputs would be applied to the edge of the plate, with respect to both the vents 42 and 41 and would not normally be applied to the port 43 which as will be explained subsequently is common to all stages of the counter when the counter is stacked.

Figure 3:
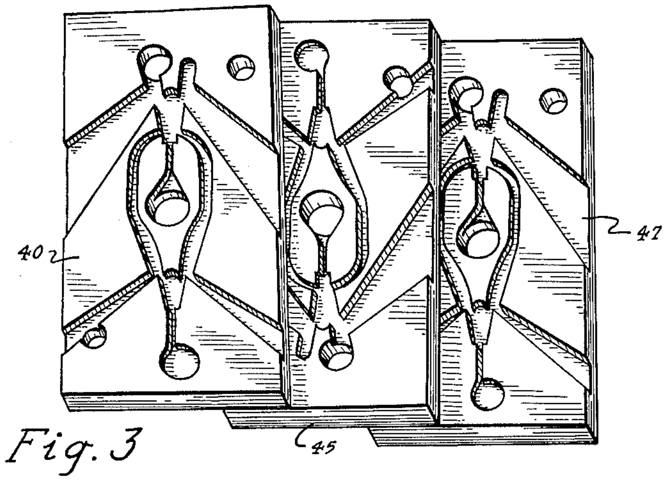
FIGURE 3 is a view in perspective of three converter stages stacked to provide a counter assembly.

Referring now specifically to FIGURE 3 of the accompanying drawings, there is illustrated a three stage counter employing the individual binary stages as illustrated in FIGURE 2 of the accompanying drawings. The three stage counter of FIGURE 3 comprises plates 40, 45 and 47 stacked one above the other so that each plate forms the sealing cover for the stage formed in the plate below it. Each of the plates has a stage formed therein identical with the stage illustrated in FIGURE 2. However, each of the plates is rotated 180° about the axis of its port 2 relative to its two adjacent plates so that the outlet port 34 of the uppermost plate 40 lies over the inlet port 39 of the next plate 45 and the outlet port 34 of the plate 45 lies over the inlet port 39 of the plate 47. If all of the devices are shifted to their zero state; that is, with their flows to the ports 34 through the channels 24, fluid is supplied from the amplifier of the plate 40 to the inlet port 39 of the plate 45 and the fluid from the port 34 of the plate 45 is supplied to the inlet passage 39 to the plate 47. The orifices 3 are all aligned at the center of the plates so that the main supply of fluid is supplied to the nozzles 4 of each of the amplifiers. It will be noted that the orifice of reset port 43 of the plate 40 is in alignment with a further port 48 in the plate 45 so that fluid applied to the port 43 of the plate 40 passes through plate 45 and is applied to the port 43 in the plate 47. Similarly, the port 43 of the plate 45 is aligned with the passages 48 in the plates 40 and 47 to provide a feed through of the reset signals to the various control ports.

In operation and assuming that all three devices are applying fluid to their outlet passages 34, fluid is applied through the input ports 39 of plates 45 and 47 to their corresponding passages 16. Flow of fluid from nozzles 37 to passages 16 of plates 45 and 47 has been assured by an initial reset signal applied through passage 43 to vent 42. Flow from the passages 16 joins the flow from the nozzles 4 and enters the outlet ports 34. With regard, however, to the plate 40 which is the first stage of the counter and receives the input fluid pulses to be counted, there is initially no fluid applied to its input port 39. When a fluid pulse to be counted is applied to the fluid input port 39, a stream issues from the nozzle 37 of plate 40 and due to the counterclockwise fluid flow through passages 16 and 17 the fluid from the nozzle 37 is deflected to the passage 17. Fluid issues from the orifice 14 and causes fluid from nozzle 4 to enter the output channel 23. The flow of fluid to the input port 39 of the plate 45 is discontinued but no other alteration is detected in the system of plate 46. The next pulse applied to the input port 39 of the plate 40 is deflected, due to counterclockwise flow around the island divider 18, into the passage 16 and deflects the main fluid stream into the outlet passage 24, thus re-establishing a zero count in the first stage. The flow through the port 34 enters the port 39 of the plate 45. The flow from the nozzle 4 in the plate 45 has been to the passage 24 and thus when fluid now issues from the nozzle 37, clockwise flow around the island divider 18 causes the stream to pass through the channel 17 to the orifice 14. Fluid issuing from the orifice 14 causes the stream issuing from the nozzle 4 to be deflected to the passage 23 thus establishing a count of one in the plate 45. Since this is the second stage, the count of the counter is now "10" which is a 2 in the binary system. The action of the device continues in this manner until a total count of seven is reached at which point the next count causes the counter to cycle back to a count of zero.

The vortex transfer provided between the port 34 of the plate 40 for instance and the port 39 of plate 45 forms no part of the present invention but is the subject matter of co-pending patent application Ser. No. 245,560, filed on Dec. 18, 1962, by Francis M. Manion and assigned to the same assignee as the present invention.

Figure 4:
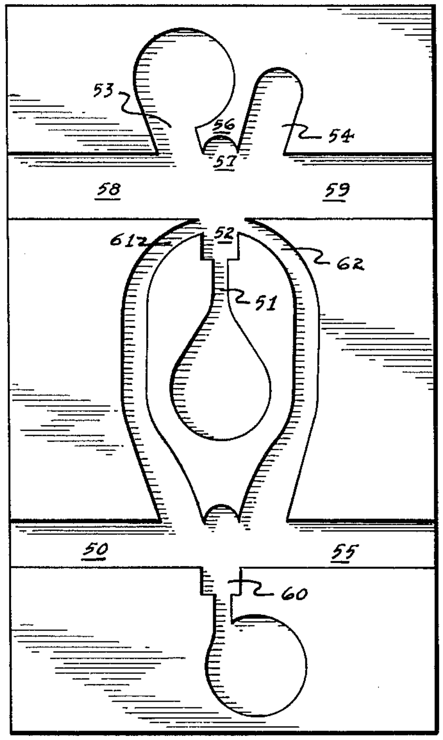
FIGURE 4 illustrates a first modification of the converter stage of FIGURE 2.

Referring now specifically to FIGURE 4 of the accompanying drawings, there is illustrated a modification of the apparatus illustrated in FIGURE 2, which modification achieves a greater pressure recovery than the previously described units. More specifically, the apparatus comprises a power nozzle 51 issuing through a booster section 52 into one or another of outlet passages 53 and 54. A divider 56 is disposed between the passages and provided with a double cusp arrangement generally designated by the reference numeral 57. In this respect the apparatus of FIGURE 4 is the same as the apparatus of FIGURE 2. However, in the present apparatus, the overflow vents 58 and 59 are provided which encompass the entire region between control nozzles 61 and 62 respectively and the bottom of divider 56, thereby eliminating the side walls 11 and 12 from the apparatus of FIGURE 2. The vents as illustrated, are of such a nature that they cannot be moved relative to the bottom of the divider 56 and therefore the same degree of control of pressure in the outlet passages 53 and 54 cannot be achieved as can be achieved in the apparatus of FIGURE 2. However, the elimination of the sidewalls permits an increase in recovery of the pressure in the fluid issued by the power nozzle 51, the pressure recovery in such a unit being between 50 to 60% whereas the apparatus of FIGURE 2 provides pressure recovery of between 30 to 50% maximum. The increase in pressure recovery is also a partial function of the fact that the divider 56 is closer to the nozzle 51 than in the corresponding region in the apparatus of FIGURE 2. The close spacing is permissible since the spacing required to provide the sidewalls 11 and 12 of FIGURE 2 is not required in this latter figure.

It will be noted that the lower flip-flop section of the apparatus of FIGURE 4 is provided with a booster region 60 to provide for more positive lock-on of the stream issuing from the nozzle than is provided by the apparatus of the prior figures. Vents 50 and 55 are provided for permitting the application of input signals and also to permit overflow of signals provided to the channels leading to the orifices or control nozzles 61 and 62. The use of the booster section 60 prevents the formation of vortices in the region of the main power nozzle and therefore it is not necessary for the vents 50 and 55 in this embodiment of the invention to issue directly into the passages around the island divider as in the prior devices. In this device, however, the circulation around the island divider is not as well defined as in the prior devices and the apparatus of FIGURE 4 is less sensitive to the position of the stream issuing from the power nozzle 51 than the other devices described.

Figure 5:
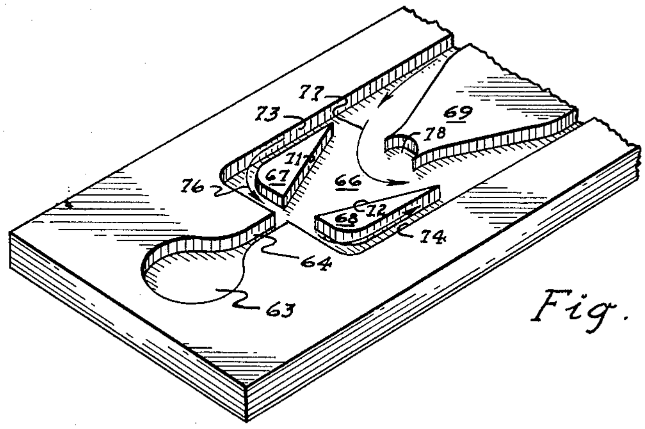
FIGURE 5 illustrates a modification of the input pulse flow control portion of the converter of FIGURE 2.

Referring now specifically to FIGURE 5 of the accompanying drawings there is illustrated a further modification of the portion of a counter stage for controlling the direction of flow of the input pulse. An input fluid pulse may be applied through a port 63 to a nozzle 64 which issues fluid into a region 66 established between two members 67 and 68 which are mirror images of one another about the axis of the nozzle 64. The device is provided with an island divider 69 located downstream of the members 67 and 68. The members 67 and 68 define in effect the sidewalls 71 and 72 of the same general arrangement as provided in the lower portion of the FIGURE 2 just downstream of the nozzle 37. However, there are channels provided between the members 67 and 68 and a left sidewall 73 and a right sidewall 74, respectively, of this portion of the apparatus. Thus, a flow path is established through channels between the wall 73 and the member 67 so that when fluid is feeding back, for instance, in a counterclockwise direction, fluid flows in the region indicated by arrow 76 in addition to flowing along a path described by arrows 77. Thus, fluid flow is established at right angles to and immediately adjacent the end of the nozzle. Such flow is more effective in diverting the fluid stream than the flow established in the apparatus of FIGURE 2, which is relatively remote from the nozzle 37 and is not at right angles thereto. The construction providing members 67 and 68 also causes fluid to flow along the line indicated by arrow 76 when the main stream is directed to the right of the island divider. This flow tends to maintain the stream in its deflected position and in conjunction with the cusp arrangement 78, renders the device relatively insensitive to back pressures established in the channels along the sides of the island divider 69 and eliminates the need in certain instances for the vents 41 and 42 described with respect to FIGURE 2.

Figure 6:
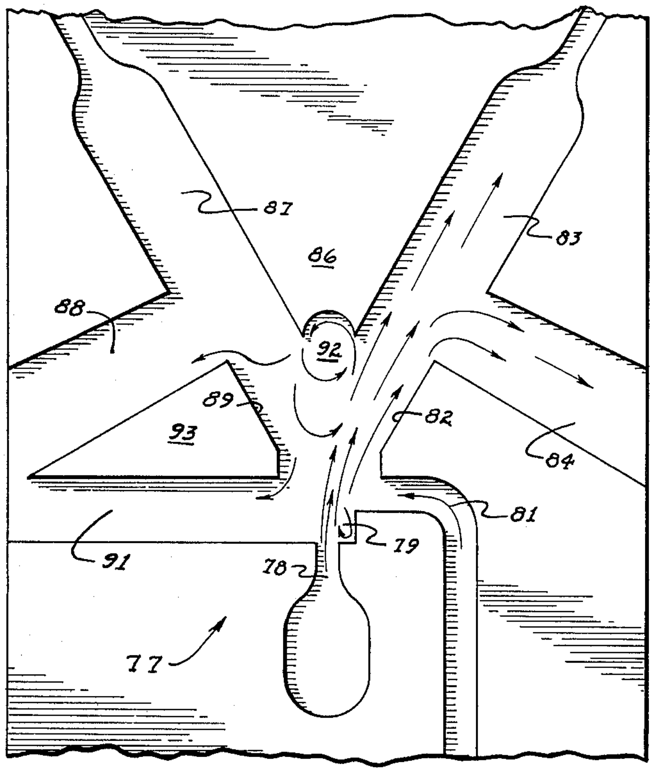
FIGURE 6 is an illustration of a pulse inverter amplifier employing a modified form of the basic flip-flop element illustrated in FIGURE 1.

Referring now specifically to FIGURE 6 of the accompanying drawings, there is illustrated an inverter pulse amplifier utilizing the principles of the present invention. The amplifier generally designated by the reference numeral 77 is asymmetrically about the centerline through its power nozzle 78. More specifically, the portion of the amplifier to the right of the centerline is substantially identical for all intents and purposes to the right hand portion of the amplifier of FIGURE 2 of the accompanying drawings including channel 23, wall 11, interaction region 7, control orifice 13, etc. The arrangement of FIGURE 6 provides on the right of its centerline a booster section 79, a control orifice 81, a sidewall 82, an output channel 83 and a vent channel 84. A splitter 86 is identical with the splitter illustrated in FIGURE 2 and is therefore symmetrical with respect to the centerline of the orifice 78. The lefthand portion of the inverter amplifier 77 comprises an output channel 87, a vent channel 88 and a side wall 89 all of which in construction are identical with the corresponding elements of the flip-flop of FIGURE 2. However, in the apparatus of FIGURE 6, the left half of the booster section is omitted and the nozzle 78 terminates in a channel 91 extending perpendicular to the nozzle 78 and encompassing the control orifice of the apparatus of FIGURE 2. As illustrated in FIGURE 6, the channels 88 and 91 and interaction region 92 define a generally pie-shaped member 93 which terminates at the intersection of the channels 88 and 91. In operation, when a power stream is initially issued from the nozzle 78, the one-half booster section 79 causes the power stream to be deflected to the right where it contacts the wall 82 and exits through the outlet channel 83. The construction of the divider 86 provides the cusps for producing counterclockwise circulation of fluid to increase the stability of the deflection of the stream to the right side of the apparatus. The location of the bottom of the divider 86 relative to the vents 84 and 88 permits control of the pressure in the outlet channel 87. When a control signal is applied to the control orifice 81 and flow issues therefrom, the stream is deflected to the left attaching to the sidewall 89 and exiting through the channel 87. The boundary layer region established between the power stream and the sidewall 89 in conjunction with the effect of the cusp arrangement at the bottom of the divider 86 provides for high stability retention of the stream in its lefthand position so long as a signal is applied to the control orifice 81. However, as soon as the input signal is terminated, the action of the booster region 79 is such that the power stream is quickly deflected to the right and again exits from the amplifier 77 through the outlet channel 83.

The inverter action of the amplifier is readily detectable in that an output signal is available from the passage 83 so long as no input signal is applied. However, upon the application of an input signal, the output signal is terminated from the channel 83 and is re-established upon discontinuance of the output signal. Thus, the output signal from channel 83 is a positive pressure or flow except during those intervals that positive pressure or flow is applied to the control orifice 81 at which time the pressure or flow in the channel 83 is reduced and is then re-established when the pressure applied to the orifice 81 is discontinued.

The apparatus of the invention is described as employed in its more conventional environment and in its more conventional form. It is not intended to limit the devices to such uses and forms and for instance it is not essential to construction of a counter to stack the elements one above the other. This arrangement provides the smallest most compact structure but arrangements such as those illustrated in the aforesaid Warren patent may also be employed. Also, counter stages of the present invention, in addition to that illustrated in FIGURE 2, may be employed in the counters described. Further the apparatus is described as operating in an open system; that is, the vent channels are open to ambient conditions. The apparatus may be employed in a closed system in which case, the vent channels would be appropriately returned to a reference pressure other than ambient.

While I have described and illustrated several specific embodiments of my invention, it will be clear that variations of the details of construction which are specifically illustrated and described may be resorted to without departing from the true spirit and scope of the invention as defined in the appended claims.

What I claim is:

1. A fluid amplifier device of the boundary layer type comprising an interaction region defined by a pair of sidewalls and a flow divider located at one end of said interaction region, a power nozzle located at the other end of said interaction region for issuing a stream of fluid toward said flow divider, said sidewalls being located such with respect to said nozzle to establish boundary layer effects between said sidewalls and a fluid stream issued by said nozzle, said flow divider having walls diverging outwardly in a downstream direction, a pair of output channels each defined by a different one of said sidewalls and a different one of said walls of said flow divider, a pair of vent channels each extending through a different one of said sidewalls at a location in line with the upstream end of said flow divider, said vent channels communicating with a region of reference pressure, said flow divider having a concave region formed in the end thereof facing said power nozzle, said region diverting a portion of the fluid stream into the vent channel, the output channel and the control orifice on the side of the interaction region remote from the output channel to which the fluid stream is directed.

2. The combination according to claim 1 further comprising a booster section located between said control orifices and said nozzle, said booster section comprising a region having walls extending from the end of said nozzle toward said flow divider and being spaced to define a passage wider than said nozzle and narrower than said interaction region whereby boundary layer effects are established between said walls and said fluid stream issued by said nozzle.

3. A fluid amplifier device of the boundary layer type comprising an interaction region, a power nozzle for issuing a stream of fluid into said interaction region, a pair of sidewalls and a flow divider located downstream of said nozzle and defining said interaction region, said flow divider lying in intercepting relationship to an undeflected stream issued by said nozzle and having outwardly diverging walls, said sidewalls being located such with respect to said nozzle to establish boundary layer effects between said sidewalls and a fluid stream issued by said nozzle, a pair of output passages each defined by a different one of said sidewalls and a different one of said walls of said divider, a booster section comprising a region having walls extending from the end of said nozzle toward said flow divider and being spaced to define a passage wider than said nozzle and narrower than the narrowest transverse dimension of said interaction region, a pair of control orifices extending through said sidewalls on opposite sides of said nozzle at the downstream end of said booster section, at least one of said sidewalls having a vent channel therethrough at a location in line with the upstream end of said divider, said vent channel communicating with a region of a reference pressure.

4. The combination according to claim 3 wherein the upstream end of said flow divider terminates in a generally concave region defining a pair of cusps located adjacent said output passages and directed toward said nozzle so as to divert a portion of the fluid stream into the vent channel, the output channel and the control orifice on the side of the interaction region remote from the output channel to which the fluid stream is directed.

5. The combination according to claim 4 wherein said vent channels are located such that a line through the ends of said cusps enters said channels at a distance from the upstream edges of said vent channels at their entrances of from 25–37 percent of their width at their entrances.

6. A fluid amplifier device of the boundary layer type comprising an interaction region, a flow divider located at one end of said interaction region, a nozzle located at the other end of said interaction region for directing fluid toward said flow divider, a pair of fluid receiving output channels extending along opposite sides of said flow divider, a pair of control orifices disposed on opposite sides of said nozzle and adjacent thereto, means for establishing boundary layer effects including a booster section located between said control orifices and said nozzle, said booster section comprising a region having walls extending from the end of said nozzle toward said flow divider and being spaced to define a passage wider than said nozzle and narrower than the narrowest transverse dimension of said interaction region whereby boundary layer effects are established between said walls and a fluid stream issued by said nozzle, a pair of vent channels extending into said interaction region adjacent the upstream end of said flow divider, said vent channels communicating with a reference pressure, a pair of input channels each extending from a different one of said control orifices along a different side of and isolated from said nozzle, said input channels joining upstream of said nozzle, said interaction region and said input channels defining an island divider, and an input nozzle for directing fluid flow toward said island divider at the junction of said input channels.

7. The combination according to claim 6 further comprising a second pair of vent channels each communicating with a different one of said input channels downstream of the junction of said input channels.

8. The combination according to claim 7 further comprising means for applying fluid signals to at least one of said second pair of vent channels.

9. The combination according to claim 7 wherein the upstream end of said island divider terminates in a concave region defining a pair of cusps directed toward said input nozzle.

10. The combination according to claim 6 further comprising a second booster section having wall extending from the end of said input nozzle toward said island divider and being spaced to define a passage wider than said input nozzle whereby boundary layer effects are established between said walls and said fluid stream issued by said input nozzle, a second pair of vent channels disposed on opposite sides of said input nozzle between said second booster section and the upstream end of said island divider.

11. The combination according to claim 10 wherein the upstream end of said island divider terminates in a concave region defining a pair of cusps directed toward said input nozzle.

12. The combination according to claim 6 further comprising a pair of members disposed on opposite sides of the centerline of said input nozzle and located between said nozzle and said island divider, each of said members defining, in part, a channel having one end directed generally at right angles to and located at the outlet of said input nozzle and having its other end adapted to receive fluid from one of said input channels, each of said members also providing a surface located such with respect to a fluid stream issued from said input nozzle as to establish boundary layer effects between said surface and the stream.

13. A fluid amplifier device of the boundary layer type comprising an interaction region defined by a pair of sidewalls and a flow divider located at one end of said interaction region, a power nozzle located at the other end of said interaction region for issuing a stream of fluid toward said flow divider, said sidewalls being located such with respect to said nozzle to establish boundary layer effects between said sidewalls and a fluid stream issued by said nozzle, said flow divider having walls diverging outwardly in a downstream direction, a pair of output channels each defined by a different one of said sidewalls and a different one of said walls of said flow divider, a pair of control orifices extending through said sidewalls on opposite sides of said nozzle in the region of said nozzle, at least one vent channel extending through one of said sidewalls at a location in line with the upstream end of said divider, said vent channel communicating with a region of a reference pressure, a pair of input channels each extending from a different one of said control orifices along a different side of said nozzle and joining upstream of said nozzle, said interaction region and said input channels defining an island divider, an input nozzle for directing fluid flow toward said island divider at the junction of said input channels, the end of said island divider opposite of said power nozzle terminating in a concave region defining a pair of cusps and a second pair of opposed vent channels communicating with said input channels adjacent said concave region.

14. A fluid pulse converter including a plurality of fluid amplifiers each formed as channels in one surface of a different flat plate, each of said amplifiers comprising said fluid amplifier of claim 6, said flat plates being stacked such that a surface of one plate having channels formed therein abuts a smooth surface of another plate, a fluid supply passage extending along the center of said plates perpendicular to said surfaces thereof, said passage communicating with said power nozzle of each of said amplifiers, alternate ones of said plates being rotated 180° about the axis of said fluid supply passage relative to the plates adjacent thereto, said amplifiers being proportioned such that one of the output channels of each of said fluid amplifiers is aligned with the input nozzle of said fluid amplifier in the adjacent plates, and means for coupling fluid from said one output channel of each fluid amplifier to said input nozzle of said fluid amplifier in one of said adjacent plates.

15. A fluid pulse converter including a plurality of fluid amplifiers each formed as channels in one surface of a different flat plate, each of said amplifiers comprising said fluid amplifier of claim 13, said flat plates being stacked such that a surface of one plate having channels formed therein abuts a smooth surface of another plate, a fluid supply passage extending along the center of said plates perpendicular to said surfaces thereof, said passage communicating with said power nozzle of each of said amplifiers, alternate ones of said plates being rotated 180° about the axis of said fluid supply passage relative to the plates adjacent thereto, said amplifiers being proportioned such that one of the output channels of each of said fluid amplifiers is aligned with the input nozzle of said fluid amplifier in the adjacent plates, and means for coupling fluid from said one output channel of each fluid amplifier to said input nozzle of said fluid amplifier in one of said adjacent plates.

16. The combination according to claim 15 further comprising means for selectively applying input signals to selected ones of said vent channels of said second pair of vent channels.

17. A fluid amplifier device of the boundary layer type comprising an interaction region defined by a pair of sidewalls and a flow divider located at one end of said interaction region, a power nozzle located at the other end of said interaction region for issuing a stream of fluid toward said flow divider, said sidewalls being located such with respect to said nozzle to establish boundary layer effects between said sidewalls and a fluid stream issued by said nozzle, said flow divider having walls diverging outwardly in a downstream direction, a pair of output channels each defined by a different one of said sidewalls and a different one of said walls of said flow divider, a pair of control orifices extending through said sidewalls on opposite sides of said nozzle in the region of said nozzle, a pair of vent channels extending through said sidewalls at a location in line with the upstream end of said divider, said vent channels communicating with a region of a reference pressure, and means for diverting a portion of the stream issued by said nozzle into the interaction region, the vent channel, the output channel and the control orifice on the side of the interaction region remote from the output channel to which the fluid stream is directed.

18. A fluid amplifier device of the boundary layer type comprising an interaction region defined by a pair of sidewalls and a flow divider located at one end of said interaction region, a power nozzle located at the other end of said interaction region for issuing a stream of fluid toward said flow divider, said sidewalls being located such with respect to said nozzle to establish boundary layer effects between said sidewalls and a fluid stream issued by said nozzle, said flow divider having walls diverging outwardly in a downstream direction, a pair of output channels each defined by a different one of said sidewalls and a different one of said walls of said flow divider, a pair of control orifices extending through said sidewalls on opposite sides of said nozzle in the region of said nozzle, at least one vent channel extending through one of said sidewalls at a location in line with the upstream end of said divider, said vent channel communicating with a region of a reference pressure, and means for controlling the static pressure in the output channel and the portion of interaction region remote from the fluid stream, said means comprising means for diverting fluid from said stream to said last-mentioned output channel, the vent channel associated therewith and said last-mentioned portion of said interaction region.

19. The combination according to claim 6 further comprising means for enhancing circulating flow through said input channels due to evacuation of one of said input channels by the fluid stream from said power nozzle, said means comprising means for diverting a portion of said fluid stream issued by said power nozzle to the control orifice remote from said fluid stream.

20. The combination according to claim 1 further comprising a control orifice located on one side of said nozzle and downstream therefrom, a laterally recessed booster region having a wall extending between the end of said nozzle and said control orifice on the control orifice side of said nozzle so as to establish boundary layer effects between said fluid stream and said wall, the region between the end of said nozzle and said sidewall on the side of said interaction region remote from said orifice communicating with ambient pressure.

21. The combination according to claim 3 wherein the upstream end of said flow divider terminates in a generally concave region defining a pair of cusps located adjacent said output passages and directed towards said nozzle and wherein said vent channels are located such that a line through the ends of said cusps enters said channels at a distance from the upstream edges of said vent channels at their entrances of from 25–37 percent of their width at their entrances.

22. The combination according to claim 6 further comprising a second pair of vent channels disposed on opposite sides of said island divider adjacent the upstream end of said island divider.

23. A fluid amplifier device of the boundary layer type comprising an interaction region defined by a pair of sidewalls and a flow divider located at one end of said interaction region, a power nozzle located at the other end of said interaction region for issuing a stream of fluid toward said flow divider, said sidewalls being located such with respect to said nozzle to establish boundary layer effects between said sidewalls and a fluid stream issued by said nozzle, said flow divider having walls diverging outwardly in a downstream direction, a pair of output channels each defined by a different one of said sidewalls and a different one of said walls of said flow divider, a pair of control orifices extending through said sidewalls on opposite sides of said nozzle in the region of said nozzle, at least one vent channel extending through one of said sidewalls at a location in line with the upstream end of said divider, said vent channel communicating with a region of a reference pressure, a pair of input channels each extending from a different one of said control orifices along a different side of said nozzle and joining upstream of said nozzle, said interaction region and said input channels defining an island divider, a pair of members disposed on opposite sides of the centerline of said input nozzle and located between said nozzle and said island divider, each of said members defining, in part, a channel having one end directed generally at right angles to and located at the outlet of said input nozzle and having its other end adapted to receive fluid from one of said input channels, each of said members also providing a surface located such with respect to a fluid stream issued from said input nozzle as to establish boundary layer effects between said surfaces and the stream.

References Cited by the Examiner

UNITED STATES PATENTS

| | | | |
|---|---|---|---|
| 1,658,797 | 2/1928 | Charette | 137—81.5 X |
| 3,001,539 | 9/1961 | Hurvitz. | |
| 3,001,689 | 9/1961 | Warren | 235—201 |
| 3,114,390 | 12/1963 | Glattli | 235—201 |
| 3,122,062 | 2/1964 | Spivak. | |
| 3,135,291 | 6/1964 | Kepler | 137—608 |
| 3,144,037 | 8/1964 | Cargill | 137—81.5 X |

FOREIGN PATENTS

| | | |
|---|---|---|
| 1,278,781 | 11/1961 | France. |
| 1,278,782 | 11/1961 | France. |

OTHER REFERENCES

Technical paper (1), Warren, et al., Fluid Amplification (1), U. S. Army Materiel Command, Harry Diamond Laboratories, Washington 25, D.C., Aug. 15, 1962.

Technical paper (2), Warren, Fluid Amplification (3), U. S. Army Materiel Command, Harry Diamond Laboratories, Washington 25, D.C., Aug. 25, 1962.

Article-Performance Evaluation of a High-Pressure Recovery Bistable Fluid Amplifier, by W. Booth, pages 83–90; A.S.M.E. symposium, Nov. 28, 1962.

Article: "State of the Art of Pure Fluid Systems," by R. E. Bowles, pp. 7–22, A.S.M.E. symposium.

LEO SMILOW, *Primary Examiner.*